(12) United States Patent
Khaleghimeybodi (10) Patent No.: US 10,999,668 B2
(45) Date of Patent: *May 4, 2021

(54) APPARATUS, SYSTEM, AND METHOD FOR TRAGUS CONDUCTION HEARABLE DEVICE

(71) Applicant: Facebook Technologies, LLC, Menlo Park, CA (US)

(72) Inventor: Morteza Khaleghimeybodi, Bothell, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/701,675

(22) Filed: Dec. 3, 2019

(65) Prior Publication Data

US 2020/0169800 A1 May 28, 2020

Related U.S. Application Data

(63) Continuation of application No. 15/987,937, filed on May 24, 2018, now Pat. No. 10,531,173.

(51) Int. Cl.
*H04R 1/10* (2006.01)
*G02C 11/00* (2006.01)

(52) U.S. Cl.
CPC ........... *H04R 1/1008* (2013.01); *G02C 11/10* (2013.01); *H04R 1/105* (2013.01); *H04R 2460/13* (2013.01)

(58) Field of Classification Search
CPC ...... G02C 11/10; H04R 1/1008; H04R 1/105; H04R 2460/13
See application file for complete search history.

(56) References Cited

U.S. PATENT DOCUMENTS

| | | | |
|---|---|---|---|
| 8,886,263 B2 * | 11/2014 | Hosoi | H04M 1/05 455/575.2 |
| 9,485,593 B2 * | 11/2016 | Inagaki | H04R 17/00 |
| 9,729,971 B2 | 8/2017 | Hosoi et al. | |
| 9,872,113 B2 | 1/2018 | Inagaki | |
| 10,231,046 B1 | 3/2019 | Miller et al. | |
| 10,531,173 B2 | 1/2020 | Khaleghimeybodi | |

FOREIGN PATENT DOCUMENTS

CN          110536200 A       12/2019

OTHER PUBLICATIONS

Non-Final Office Action received for U.S. Appl. No. 15/987,937 dated May 16, 2019, 17 pages.
Notice of Allowance received for U.S. Appl. No. 15/987,937 dated Aug. 28, 2019, 15 pages.
(Continued)

*Primary Examiner* — Brian Ensey
(74) *Attorney, Agent, or Firm* — FisherBroyles, LLP (57) ABSTRACT

A tragus conduction apparatus may include a sound transducer positionable against a tragus of a user's ear to mechanically vibrate the tragus to produce one or more sound waves that travel down an ear canal of the user's ear toward an eardrum. A wearable device may include a tragus conduction apparatus and a wearable frame dimensioned to adjustably hold the tragus conduction apparatus at the user's ear. Various other apparatuses, systems, and methods are also disclosed.

20 Claims, 6 Drawing Sheets

(56) References Cited

OTHER PUBLICATIONS

Aftershokz, "General FAQs", URL: https://aftershokz.com/pages/general-faqs, as accessed on Mar. 6, 2018, pp. 1-5.
Hosoi et al., "Development of cartilage conduction hearing aid", Archives of Materials Science and Engineering, vol. 42, No. 2, Apr. 2010, pp. 104-110.
Nishimura et al., "Is Cartilage Conduction Classified Into Air or Bone Conduction?", The Laryngoscope, vol. 124, No. 5, May 2014, pp. 1214-1219.

* cited by examiner

FIG. 6

APPARATUS, SYSTEM, AND METHOD FOR TRAGUS CONDUCTION HEARABLE DEVICE

CROSS REFERENCE TO RELATED APPLICATION

This application is a continuation of U.S. application Ser. No. 15/987,937, filed May 24, 2018 the disclosure of which is incorporated, in its entirety, by this reference.

BACKGROUND

Audio devices that generate sound can be used for many purposes. For example, users may listen to music through speakers, conduct telephonic calls using headphones, or hear sounds on a headset to enhance a virtual reality experience. Typically, most audio devices provide either a personal listening experience for one user or generate sound within a space for many users. Different devices may be designed differently based on the type of usage. For example, speakers that provide music to many users may project louder sound to travel a longer distance than headphones used by a single user.

However, traditional methods of providing audio feedback may have some restrictions. For example, devices for personal listening may cover a user's ears or fit into the opening of the ears to ensure the user comfortably hears the generated sounds. These devices often block out ambient sounds around the user, sometimes to provide noise-cancelling functions. However, for usage in various situations, such as while using augmented or virtual reality devices, users may want to be aware of their surroundings and environmental sounds. In these instances, traditional headphones and earpieces may prevent users from clearly hearing important sounds, such as sirens or speech, due to the position and design of the headphones. In contrast, some types of headphones that allow users to hear ambient noises may also allow sounds from the headphones to leak, causing excessive sound leakage. Thus, better methods of generating sound are needed to allow ambient sounds to reach a user while reducing sound leakage.

SUMMARY

As will be described in greater detail below, the instant disclosure describes various apparatuses, systems, and methods for hearable tragus conduction by vibrating a user's cartilaginous tragus to create an audible sound wave that hits the user's eardrum while leaving the user's ear canal open to hearing ambient sounds. In one example, a tragus conduction apparatus may include a sound transducer positionable against a tragus of a user's ear to mechanically vibrate the tragus to produce one or more sound waves that travel down an ear canal of the user's ear toward an eardrum.

In some embodiments, the sound transducer may convert an electrical signal to a vibration such that the tragus of the user's ear acts as a speaker cone for the sound transducer. In these embodiments, the vibration of the sound transducer may be calibrated based on a sound pressure detected by a microphone positionable at an opening of the ear canal to detect the sound pressure of a sound wave produced by the sound transducer. Additionally, in these embodiments, the microphone may be positionable at the opening of the ear canal such that the ear canal is unobstructed.

In some examples, the sound transducer may include a cushioning material disposed at a location configured to contact the tragus of the user's ear.

In one embodiment, the sound transducer may direct the sound wave down the ear canal to reduce sound leakage outside of the user's ear.

In one example, the tragus conduction apparatus may be configured to produce an intended sound when the sound transducer is positioned against the tragus of the user's ear. Additionally, the tragus conduction apparatus may be configured to not produce the intended sound when the sound transducer is positioned at, and when vibrations are transmitted through, a cranial bone region near the user's ear.

According to various embodiments, a corresponding wearable device may include a tragus conduction apparatus positionable at a user's ear that may include a sound transducer that mechanically vibrates a tragus of the user's ear to produce one or more sound waves that travel down an ear canal of the user's ear toward an eardrum. The wearable device may also include a wearable frame dimensioned to adjustably hold the tragus conduction apparatus at the user's ear.

In some examples, the tragus conduction apparatus may further include a microphone that detects a sound pressure of the sound wave produced by a vibration of the tragus of the user's ear by the tragus conduction apparatus. In these examples, the microphone may be positionable at an opening of the ear canal such that the ear canal is unobstructed.

Additionally, in the above examples, the wearable device may further include at least a portion of a computing system that electronically couples the sound transducer and the microphone to calibrate the tragus conduction apparatus. In these examples, the computing system may calibrate the tragus conduction apparatus by comparing an expected sound pressure to the sound pressure detected by the microphone, adjusting a vibration of the sound transducer against the tragus of the user's ear, and/or improving a spatial sound balance between the tragus conduction apparatus and a second tragus conduction apparatus positioned at another ear of the user. In these examples, the second tragus conduction apparatus may include a second sound transducer that mechanically vibrates a tragus of the user's other ear and a second microphone positionable at an opening of the user's other ear to detect a second sound pressure produced by a vibration of the tragus of the user's other ear by the second sound transducer.

In one embodiment, the wearable frame may include an anchor that hooks around a portion of the user's ear and an adjustable arm, coupled to the anchor, that holds the tragus conduction apparatus at the user's ear. In this embodiment, the adjustable arm may hold the tragus conduction apparatus such that the sound transducer maintains contact with an outer surface of the tragus of the user's ear and the microphone is positioned at an opening of the ear canal.

In addition to the various systems and apparatuses described herein, the instant disclosure presents exemplary methods for hearable tragus conduction. For example, a corresponding method may include detecting, by a computing system, a command to generate a sound. The method may also include mechanically vibrating, by a sound transducer, a tragus of a user's ear to produce one or more sound waves based on the command to generate the sound. Additionally, the method may include detecting, by a microphone positioned at an opening of an ear canal of the user's ear, a sound pressure of a sound wave produced by a vibration of the tragus of the user's ear by the sound transducer. Furthermore, the method may include calibrating, by the computing system, a vibration of the sound transducer based on the sound pressure detected by the microphone.

In some embodiments, the command to generate the sound may include a measurement for a volume of the sound, a pitch of the sound, and/or a length of time to play the sound.

In one example, mechanically vibrating the tragus of the user's ear may include converting an electrical signal, from the computing system sending the command to the sound transducer, to the vibration of the sound transducer such that the tragus of the user's ear acts as a speaker cone for the sound transducer.

In one embodiment, calibrating the vibration of the sound transducer may include comparing an expected sound pressure to the sound pressure detected by the microphone, adjusting a vibration of the sound transducer against the tragus of the user's ear, and/or improving a spatial sound balance between the sound transducer and a second sound transducer positioned at another ear of the user. In this embodiment, the above method may further include mechanically vibrating, by the second sound transducer, a tragus of the user's other ear to produce one or more other sound waves based on the command to generate the sound.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes and illustrates various apparatuses, systems, and methods for hearable tragus conduction. As will be explained in greater detail below, embodiments of the instant disclosure may, by vibrating a tragus of a user's ear, conduct sound that the user can hear. Specifically, a tragus conduction device may be adjusted to fit the user's ear and cause the tragus to vibrate at a frequency that produces sound waves. The sound waves may be directed toward the user's eardrum such that the user hears an audible sound. Additionally, a microphone may be placed at the opening of the user's ear canal to detect the sound waves produced through the tragus vibration. The detected sound waves can then be used to calibrate the tragus conduction device to more accurately produce a desired sound. Such a device may also be mounted on a wearable frame for portability and ease of use.

Figure 1:
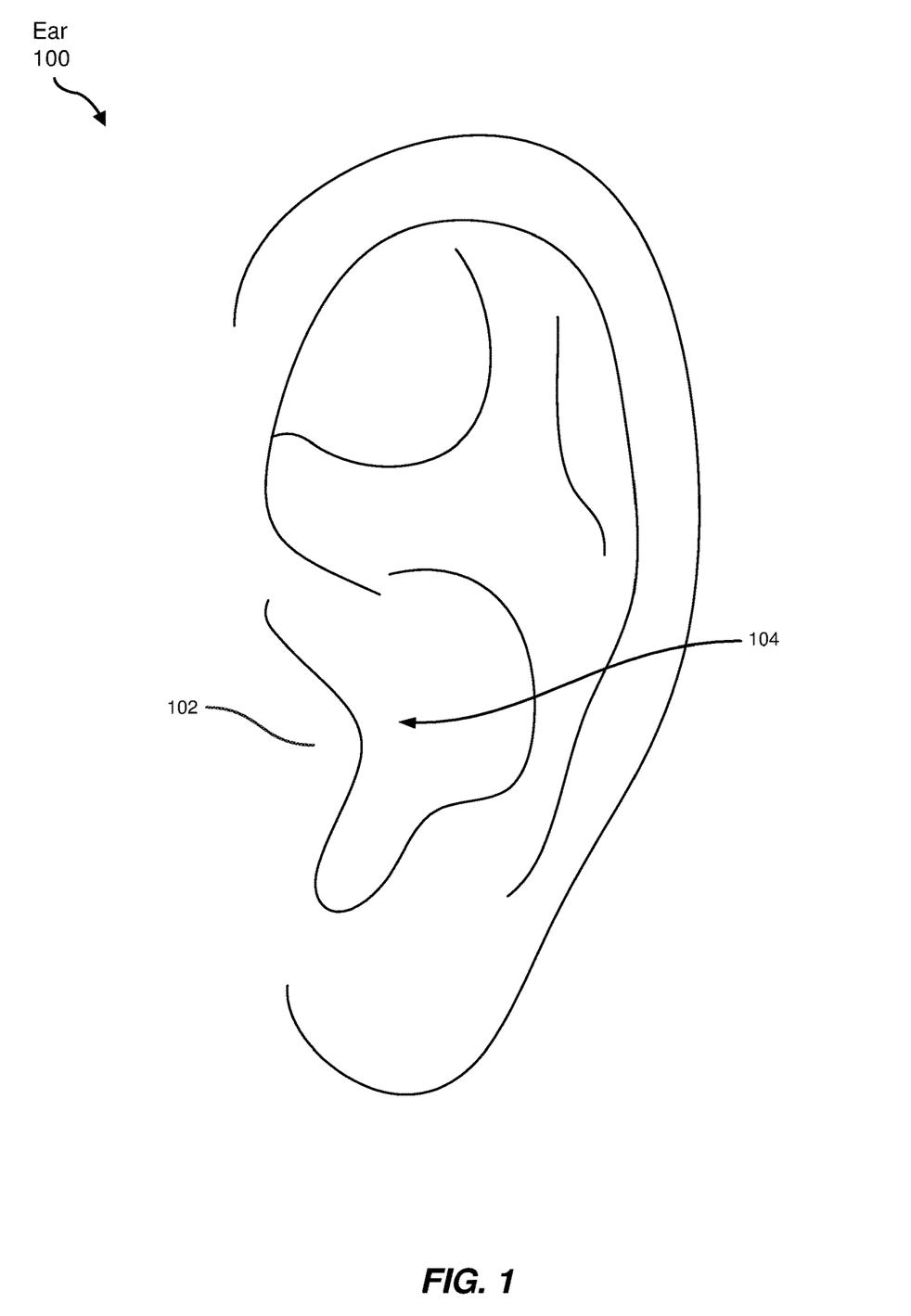
FIG. 1 is a side view of an exemplary human ear according to some embodiments.
Figure 2:
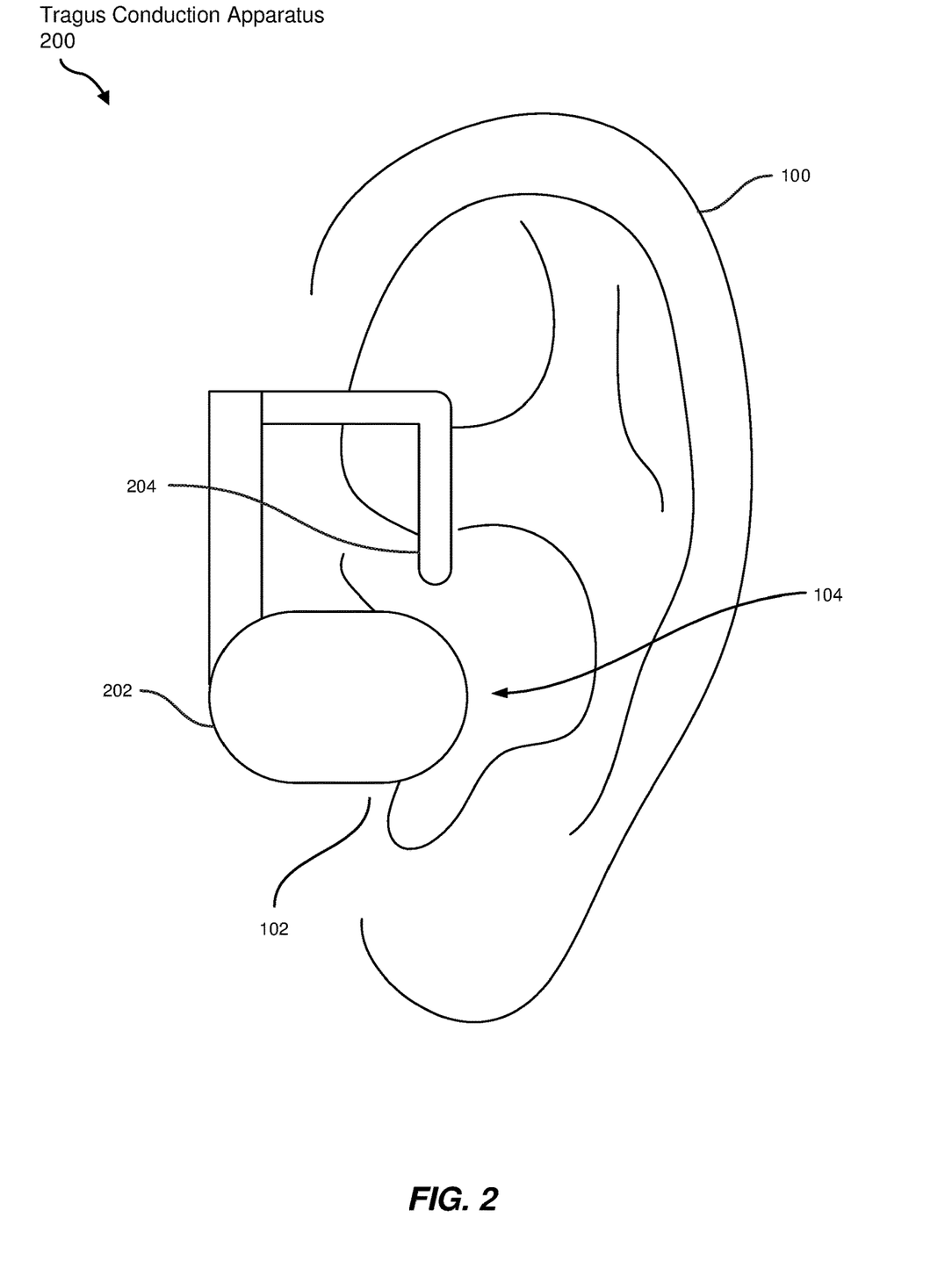
FIG. 2 is a side view of an exemplary tragus conduction apparatus fitted to the human ear according to some embodiments.

The following will provide, with reference to FIGS. 1-2, detailed descriptions of a human ear and a tragus conduction apparatus fitted to the ear. In addition, the discussion associated with FIG. 3 will provide examples of the tragus conduction apparatus vibrating a tragus of the ear to produce sound. The discussion associated with FIGS. 4-5 will provide examples of a wearable device that incorporates the tragus conduction apparatus. Furthermore, detailed descriptions of methods for hearable tragus conduction will be provided in connection with FIG. 6.

FIG. 1 illustrates a side view of an exemplary human ear 100. As shown in FIG. 1, ear 100 may include a tragus 102 protruding in front of an opening 104 of ear 100. A tragus generally refers to a cartilage-based protrusion of an external ear that lies close to and in front of an ear canal and protrudes backward to partially cover the opening of the ear canal.

FIG. 2 illustrates a side view of an exemplary tragus conduction apparatus 200 fitted to ear 100. As shown in FIG. 2, tragus conduction apparatus 200 may be a cartilage conduction apparatus that includes a sound transducer 202 that may be positionable against tragus 102 of ear 100 to mechanically vibrate tragus 102. A transducer may be a device that converts one form of energy to another. A sound transducer may, for example, convert an electrical signal to a mechanical vibration. Examples of sound transducers may include, without limitation, voice coils, dynamic coils, piezoelectric transducers, variations or combinations of one or more of the same, and/or any other type of transducer that converts a signal to a sound by vibration of tragus 102. In some embodiments, sound transducer 202 may convert an electrical signal to a vibration that is conducted through cartilage of tragus 102 such that tragus 102 of ear 100 mechanically vibrates and acts as a speaker cone or diaphragm for sound transducer 202. By directly vibrating tragus 102 using sound transducer 202, the need for other conventional sound generating elements (e.g., a diaphragm, cone, membrane, suspension, etc.) to produce sound in conjunction with sound transducer 202 may be eliminated.

As shown in FIG. 2, tragus conduction apparatus 200 may additionally include a microphone 204 that may be positionable at opening 104 of an ear canal to detect a sound pressure of a sound wave produced by tragus 102 in response to vibration of tragus 102 by sound transducer 202. A sound pressure may be a detectable difference in pressure due to a sound wave in comparison to surrounding static pressure. In some examples, microphone 204 may be positionable at opening 104 of the ear canal such that the ear canal is unobstructed or substantially unobstructed. In the example of FIG. 2, microphone 204 may be positioned above opening 104 to detect the sound wave traveling toward opening 104.

Figure 3:
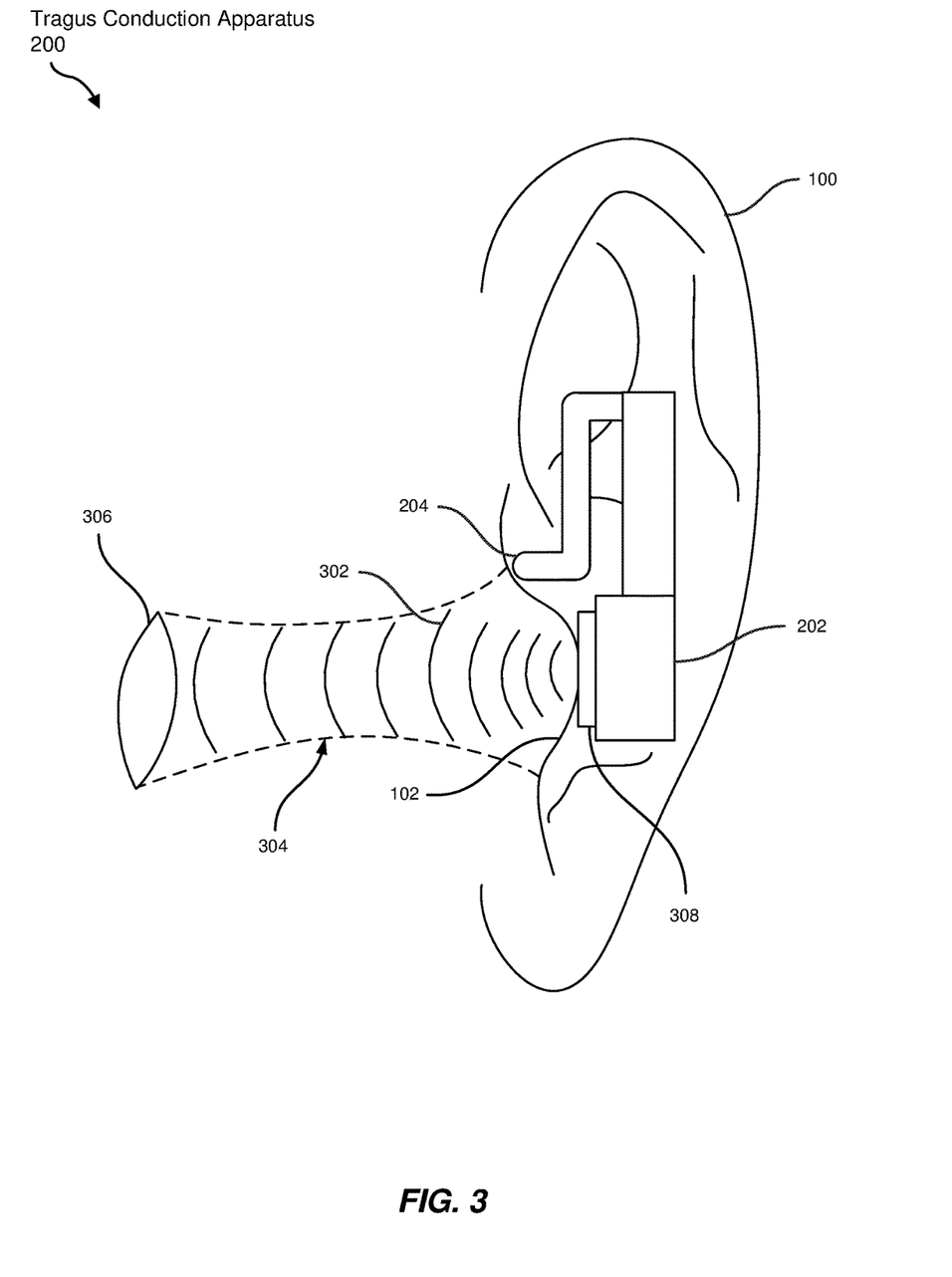
FIG. 3 is a front view of the exemplary tragus conduction apparatus vibrating a tragus of the human ear according to some embodiments.

FIG. 3 illustrates a front view of tragus conduction apparatus 200 vibrating tragus 102 of ear 100. As shown in FIG. 3, sound transducer 202 may be positioned against tragus 102 to produce a sound wave 302 that travels down an ear canal 304 of ear 100 toward an eardrum 306. As sound wave 302 hits eardrum 306, eardrum 306 may vibrate to create a sensation of sound for the user. In this example, tragus conduction apparatus 200 may be configured to produce an intended sound that is detected by eardrum 306. In contrast, positioning sound transducer 202 at a different area near ear 100, such as a cranial bone region, may not produce the intended sound and/or may produce an unintended sound. In this example, the mechanical vibration of the cranial bone region may produce a distorted sound as perceived by the user due to a different density of the cranial bone in comparison to tragus 102 and/or due to bypassing eardrum 306 to directly signal a cochlea of ear 100 through cranial bone vibration. Additionally or alternatively, the mechanical vibration produced by sound transducer 202 may not be strong enough to sufficiently vibrate the cranial bone region and, therefore, may not produce the intended sound. Thus, tragus conduction apparatus 200 may mechanically vibrate tragus 102 to generate sound wave 302 directed toward eardrum 306 rather than additionally or alternatively implementing bone conduction through, for example, mechanical vibration of a cranial bone region surrounding the user's ear.

In some embodiments, tragus conduction apparatus 200 may further include microphone 204 that detects the sound pressure of sound wave 302 produced by vibrating tragus 102. In these embodiments, the vibration of sound transducer 202 may be calibrated based on the sound pressure detected by microphone 204. For example, a user may utilize microphone 204 to initially calibrate tragus conduction apparatus 200 by detecting whether sound wave 302 is an appropriate volume and/or frequency for the user. Additionally or alternatively, microphone 204 may continuously provide feedback on sound waves, such as sound wave 302, produced by sound transducer 202 during operation of tragus conduction apparatus 200. An expected sound pressure may be compared to the detected sound pressure, and tragus conduction apparatus 200 may adjust the vibration of sound transducer 202 on tragus 102 based on the comparison.

In one example, sound transducer 202 may include a cushioning material 308 disposed at a location configured to contact tragus 102 of ear 100. As illustrated in FIG. 3, cushioning material 308 may provide a buffer between sound transducer 202 and tragus 102 to provide additional comfort for the user. Cushioning material 308 may represent a rubber material, a silicone pad, and/or any other pliable material that may provide cushioning without substantially negating the vibration of sound transducer 202. In alternate examples, cushioning material 308 may represent a material of sound transducer 202 dimensioned to fit tragus 102 and/or provide a degree of comfort for the user.

In one embodiment, sound transducer 202 of tragus conduction apparatus 200 may direct sound wave 302 down ear canal 304 to reduce sound leakage outside of ear 100. Sound leakage may include sound that may be audible to a user and/or a target other than the intended target of the sound. In the example of FIG. 3, tragus conduction apparatus 200 may direct sound wave 302 toward eardrum 306 as the intended target. By directing sound wave 302 down ear canal 304, tragus conduction apparatus 200 may reduce sound leakage audible to other users.

Figure 4:
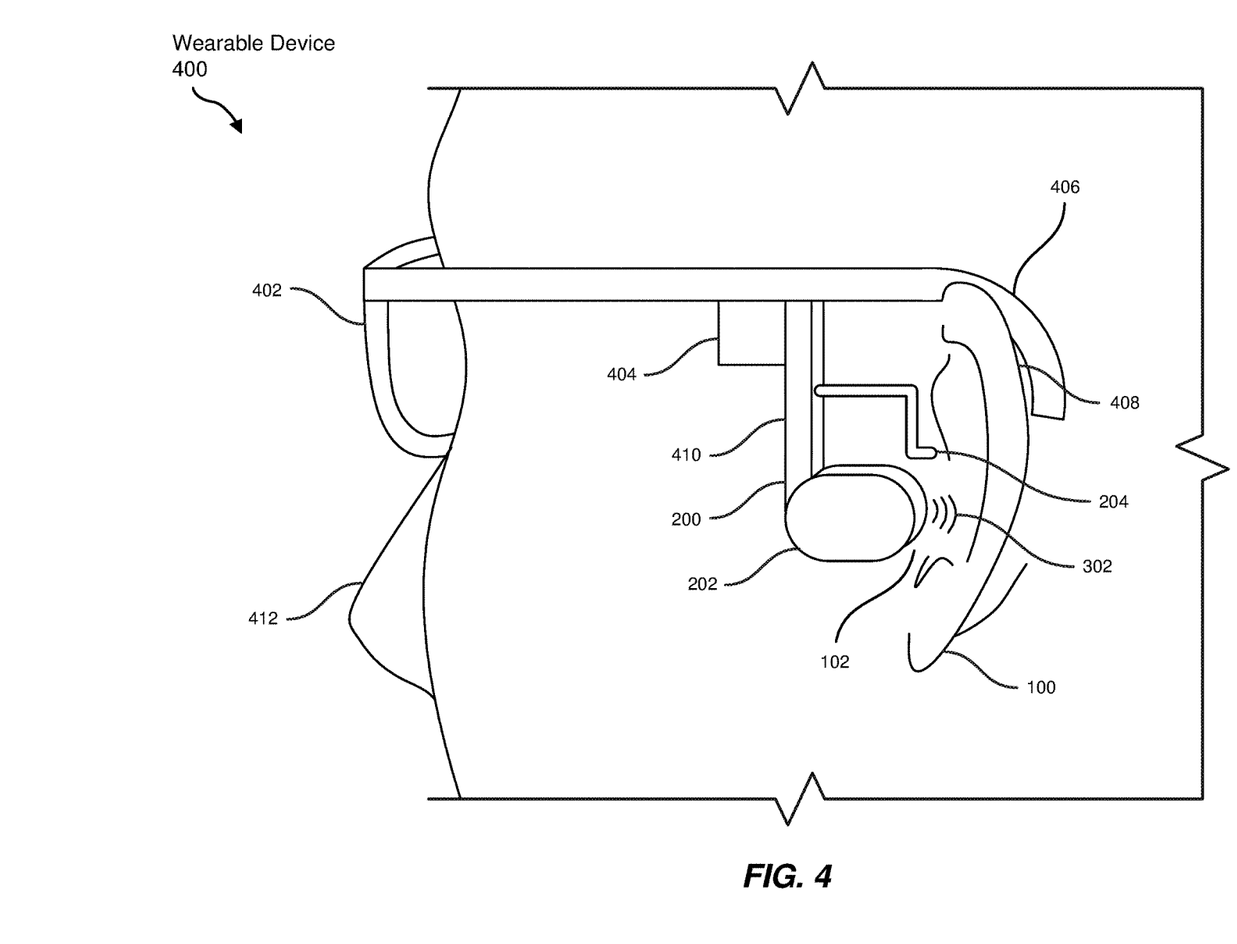
FIG. 4 is a side perspective view of an exemplary wearable device worn by a user according to some embodiments.

FIG. 4 illustrates a perspective view of an exemplary wearable device 400 worn by a user 412. As shown in FIG. 4, wearable device 400 may include tragus conduction apparatus 200 positionable at ear 100 of user 412, wherein tragus conduction apparatus 200 may include sound transducer 202 that mechanically vibrates tragus 102 to produce sound wave 302. Wearable device 400 may also include a wearable frame 402 dimensioned to adjustably hold tragus conduction apparatus 200 at ear 100. For example, wearable frame 402 may include an eyeglass frame, a behind-the-ear headphone apparatus, a behind-the-head headphone apparatus, an ear accessory, and/or any other structure that facilitates holding tragus conduction apparatus 200 in place. In some examples, wearable device 400 may include an artificial reality device, such as a virtual reality and/or augmented reality headset.

In some embodiments, wearable frame 402 may include an anchor 406 that hooks around a portion 408 of ear 100 and an adjustable arm 410, coupled to anchor 406, that holds tragus conduction apparatus 200 at ear 100. In these embodiments, adjustable arm 410 may adjustably hold tragus conduction apparatus 200 such that sound transducer 202 maintains contact with an outer surface of tragus 102 and microphone 204 is positioned at opening 104 of ear canal 304, similar to FIGS. 2 and 3. For example, adjustable arm 410 may include an adjustable spring mechanism, such as a torsion spring, that exerts a pre-loading force on tragus conduction apparatus 200 such that sound transducer 202 delivers an optimal sound pressure to tragus 102. Alternatively, adjustable arm 410 may include a rigid material coupled to wearable frame 402 that holds tragus conduction apparatus 200 at a preset position against tragus 102. Furthermore, in these embodiments, wearable frame 402 may hold tragus conduction apparatus 200 to keep ear 100 unobstructed or substantially unobstructed from hearing ambient sounds around user 412.

In one example, wearable device 400 may further include at least a portion of a computing system 404 that electronically couples sound transducer 202 and microphone 204 to calibrate tragus conduction apparatus 200. In this example, computing system 404 may calibrate tragus conduction apparatus 200 by comparing an expected sound pressure to the sound pressure detected by microphone 204, adjusting a vibration of sound transducer 202 against tragus 102, and/or improving a spatial sound balance between tragus conduction apparatus 200 and a second tragus conduction apparatus positioned at another ear of user 412. Although illustrated as a part of wearable device 400 in FIG. 4, computing system 404 may represent one or more additional devices that communicate with tragus conduction apparatus 200 by a wired and/or a wireless connection. For example, user 412 may use a smart phone in conjunction with the portion of computing system 404 on wearable device 400 to control music played by tragus conduction apparatus 200. As another example, microphone 204 may detect speech from user 412, such as a verbal command, and computing system 404 may direct tragus conduction apparatus 200 to provide a response to the command. For example, wearable device 400 may represent an artificial intelligence personal assistant that provides answers and/or information in response to inquiries by user 412.

Computing system 404 generally represents any type or form of computing device or system capable of reading computer-executable instructions. For example, computing system 404 may represent one or more endpoint devices that sends, receives, and stores data used for sound detection and calibration. Additional examples of computing system 404 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, and/or any other suitable computing device.

Figure 5:
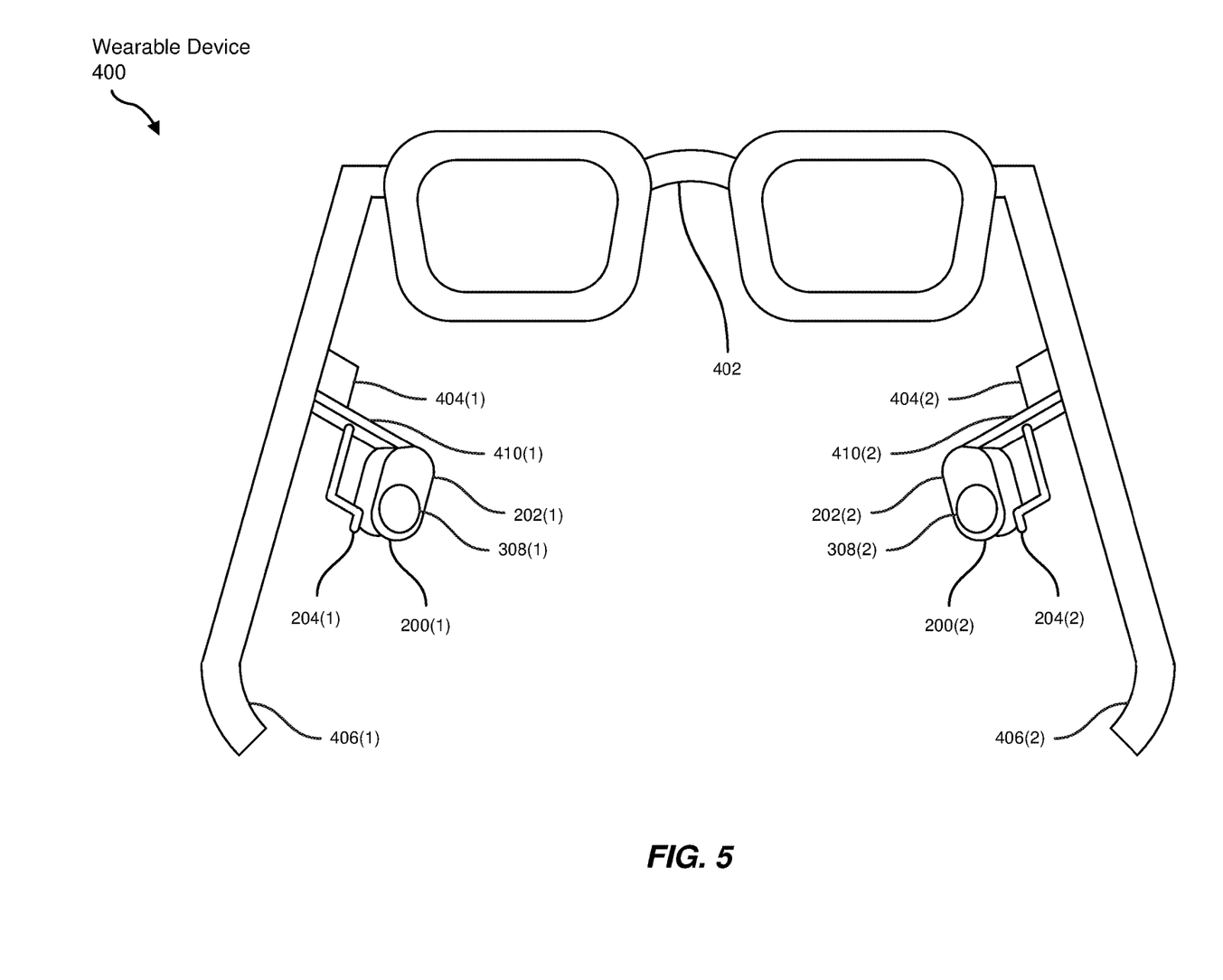
FIG. 5 is a top perspective view of the wearable device according to some embodiments.

FIG. 5 illustrates a top perspective view of wearable device 400. In one embodiment, as illustrated in FIG. 5, wearable device 400 may include a tragus conduction apparatus 200(1), similar to tragus conduction apparatus 200 of FIG. 4, that includes a sound transducer 202(1), cushioned by a cushioning material 308(1), and a microphone 204(1) electronically coupled to sound transducer 202(1) by a portion of a computing system 404(1). In this embodiment, wearable device 400 may also include a second tragus conduction apparatus 200(2) that may include a second sound transducer 202(2), with a cushioning material 308(2), that mechanically vibrates a tragus of the user's other ear. Additionally, second tragus conduction apparatus 200(2) may include a second microphone 204(2) positionable at an opening of the user's other ear to detect a second sound pressure produced by a vibration of the tragus of the user's other ear by second sound transducer 202(2). Furthermore, as illustrated in FIG. 5, anchors 406(1) and 406(2) may be dimensioned to hook around the ears of user 412 in FIG. 4. In this example, adjustable arms 410(1) and 410(2) may further adjust tragus conduction apparatuses 200(1) and 200(2) to better fit the tragi of user 412.

In some examples, a portion of computing system 404 of FIG. 4, such as computing system 404(1) and/or a computing system 404(2) in FIG. 5, may calibrate tragus conduction apparatus 200(1) and/or second tragus conduction apparatus 200(2) by improving a spatial sound balance between tragus conduction apparatus 200(1) and second tragus conduction apparatus 200(2). In these examples, computing systems 404(1) and 404(2) may coordinate as part of a single computing system and/or act independently to provide improved sound balance between the user's ears and/or calibrate generated sound waves to represent sound originating from varying distances and/or directions. For example, a head-related transfer function (HRTF) may be used for each ear to adjust sound waves to deliver spatial audio by simulating sound in a three-dimensional space through binaural audio reproduction. In this example, a signal driving sound transducer 202(1) may be filtered with a left HRTF and a signal driving sound transducer 202(2) may be filtered with a right HRTF.

Figure 6:
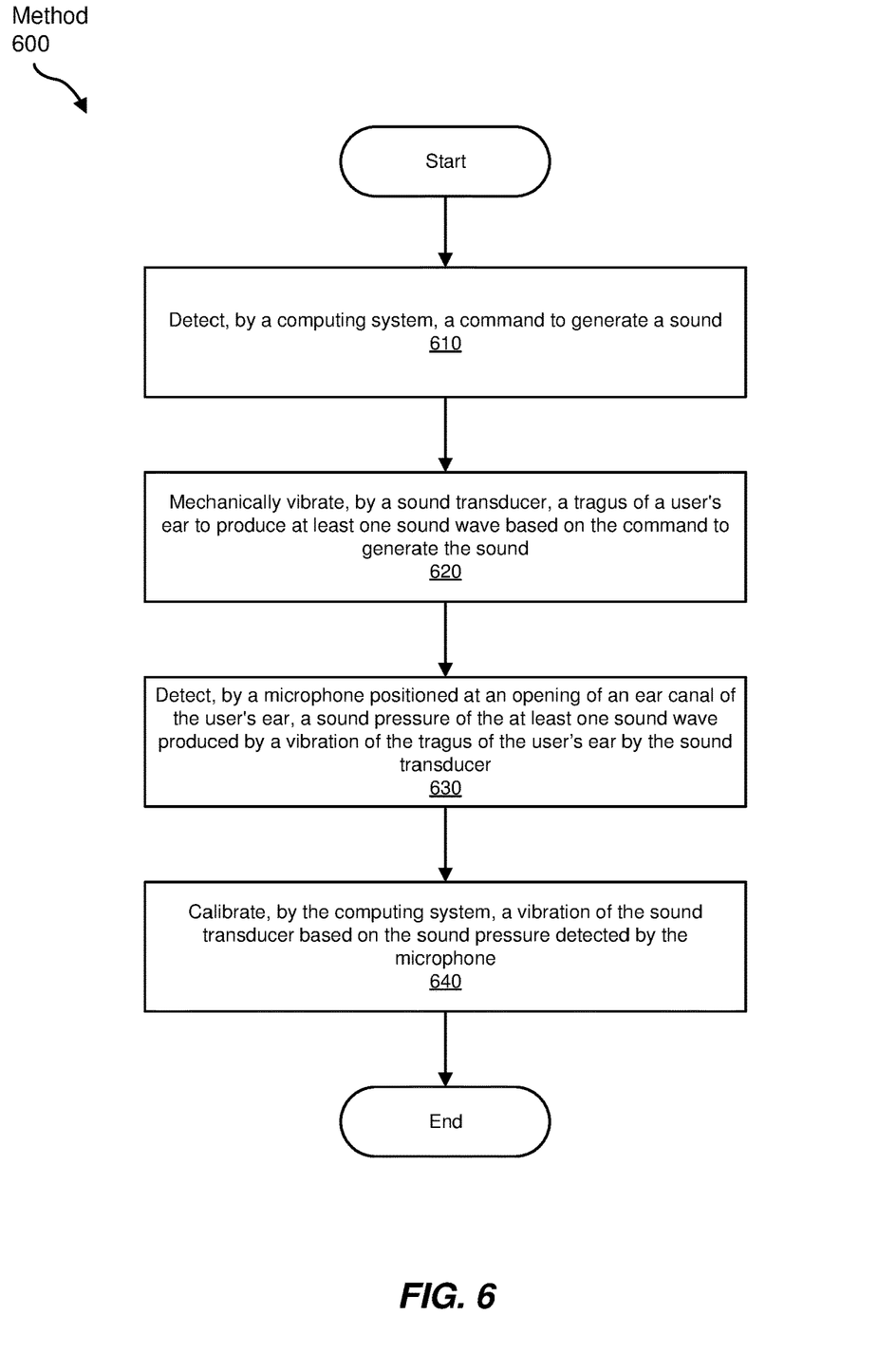
FIG. 6 is a flow diagram of an exemplary method for hearable tragus conduction according to some embodiments.

FIG. 6 shows a flow diagram of an exemplary computer-implemented method 600 for hearable tragus conduction. The steps shown in FIG. 6 may be performed by any suitable type or form of manual and/or automated apparatus and/or by any suitable computing system, including tragus conduction apparatus 200 and/or wearable device 400 illustrated in FIGS. 2-5. In one example, each of the steps shown in FIG. 6 may represent an algorithm whose structure includes and/or is represented by multiple sub-steps, examples of which will be provided in greater detail below.

As shown in FIG. 6, at step 610, one or more of the systems described herein may detect, by a computing system, a command to generate a sound. For example, computing system 404 illustrated in FIG. 4 may detect the command to generate the sound from an external device, such as a smart phone and/or an augmented reality device.

The systems described herein may perform step 610 of FIG. 6 in a variety of ways. In some embodiments, the command to generate the sound may include a measurement for a volume of the sound, a pitch of the sound, and/or a length of time to play the sound. For example, user 412 of FIG. 4 may send a command from a smart phone to tragus conduction apparatus 200 via computing system 404 to play music. Computing system 404 may determine the volume and the pitch of the sound required to replicate the music based on the command. In particular, computing system 404 may determine a size and a frequency of a sound wave needed to replicate the correct volume and pitch.

At step 620, one or more of the systems described herein may mechanically vibrate, by a sound transducer, a tragus of a user's ear to produce one or more sound waves based on the command to generate the sound. For example, as illustrated in FIG. 4, sound transducer 202 may vibrate tragus 102 of ear 100 to produce sound wave 302 based on the command.

The systems described herein may perform step 620 of FIG. 6 in a variety of ways. In one example, mechanically vibrating tragus 102 of ear 100 in FIG. 4 may include converting an electrical signal, from computing system 404 sending the command to sound transducer 202, to the vibration of sound transducer 202 such that tragus 102 acts as a speaker cone for sound transducer 202. In this example, computing system 404 may command sound transducer 202 to vibrate tragus 102 for a specified length of time at a specified volume and/or pitch based on the command. For example, sound transducer 202 may vibrate tragus 102 more strongly to produce louder sound waves and/or more quickly to produce higher pitches.

At step 630, one or more of the systems described herein may detect, by a microphone positioned at an opening of an ear canal of the user's ear, a sound pressure of the sound wave produced by a vibration of the tragus of the user's ear by the sound transducer. For example, as illustrated in FIG. 3, microphone 204 may be positioned at the opening of ear canal 304 to detect sound wave 302 produced by sound transducer 202 vibrating tragus 102.

The systems described herein may perform step 630 of FIG. 6 in a variety of ways. In one embodiment, microphone 204 may detect all sounds directed to ear canal 304 as illustrated in FIG. 3. Additionally or alternatively, microphone 204 may be calibrated to specifically detect sounds from sound transducer 202.

At step 640, one or more of the systems described herein may calibrate, by the computing system, a vibration of the sound transducer based on the sound pressure detected by the microphone. For example, computing system 404 illustrated in FIG. 4 may calibrate the vibration of sound transducer 202 based on microphone 204 detecting the sound pressure of sound wave 302.

The systems described herein may perform step 640 of FIG. 6 in a variety of ways. In some examples, as illustrated in FIG. 4, calibrating the vibration of sound transducer 202 may include comparing an expected sound pressure to the sound pressure detected by microphone 204, adjusting a vibration of sound transducer 202 against tragus 102 of ear 100, and/or improving a spatial sound balance between sound transducer 202 and a second sound transducer, such as second sound transducer 202(2) of FIG. 5, positioned at another ear of user 412. In these examples, method 600 may further include a step in which the systems described herein may mechanically vibrate, by second sound transducer 202(2), a tragus of the user's other ear to produce one or more other sound waves based on the command to generate the sound. For example, sound transducer 202(1) and second sound transducer 202(2) of FIG. 5 may coordinate to produce sounds for an augmented reality system wherein sound transducer 202(1) produces a different sound wave than second sound transducer 202(2) to replicate a dynamic environment. Additionally or alternatively, sound transducer 202(1) and second sound transducer 202(2) may produce similar sound waves to create a uniform sound.

As discussed throughout the instant disclosure, the disclosed methods, systems, and apparatuses may provide one or more advantages over traditional methods for producing audible sound. For example, by vibrating a user's tragus, a tragus conduction apparatus may reduce sound leakage outside of the user's hearing range and distance while leaving an ear canal unobstructed or substantially unobstructed to enable the user to hear ambient sounds from the environment. A microphone positioned at the ear canal may detect sound waves produced by vibrating the tragus and a computing system may improve the calibration of the tragus conduction apparatus by comparing the sound detected by the microphone with an expected sound. The tragus conduction apparatus may then be implemented as part of a wearable device, which may include a sound transducer at each ear of the user, to portably produce audible sounds.

Additionally, tragus conduction may improve over previous conduction methods, such as bone conduction, by providing a less complex anatomy to reduce sensitivity to positioning and to create a better universal fit for users. An adjustable arm may further improve the fit of the tragus conduction apparatus, and a cushioning material may improve the wearable comfort of the apparatus. Tragus conduction may also enable the generation of higher frequency sound pressure using a minimal portion of the ear. Thus, the methods, systems, and apparatuses described herein may improve the production of audible sound for a single user while permitting environmental, ambient sounds to reach the user.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

As detailed above, the computing devices, systems, and subsystems described and/or illustrated herein broadly represent any type or form of computing device or system capable of executing computer-readable instructions. In their most basic configuration, these computing device(s) may each include at least one memory device and at least one physical processor.

In some examples, a memory device may be any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, a physical processor may be any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

In some embodiments, a computer-readable medium may be any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A wearable apparatus comprising:
   a sound transducer positionable against a tragus of a user's ear to convert an electrical signal to a vibration such that the tragus of the user's ear acts as a diaphragm for the sound transducer;
   a microphone positionable at an opening of a canal of the user's ear to detect sound pressure of a sound wave produced by the tragus; and
   a computing system communicatively coupled to the sound transducer and the microphone and programmed to:
   compare an expected sound pressure to sound pressure detected by the microphone; and
   calibrate, based on the comparison of the expected sound pressure to the detected sound pressure, a vibration of the sound transducer.

2. The wearable apparatus of claim 1, wherein:
   the microphone is configured to continuously provide feedback produced by the sound transducer during operation of the wearable apparatus; and
   the computing system is programmed to calibrate the vibration of the sound transducer during the operation of the wearable apparatus.

3. The wearable apparatus of claim 2, wherein the computing system is programmed to use an initial calibration to detect whether sound waves detected by the microphone during the operation of the wearable apparatus are an appropriate volume for a user.

4. The wearable apparatus of claim 2, wherein the computing system is programmed to use an initial calibration to detect whether sound waves detected by the microphone during the operation of the wearable apparatus comprise an appropriate frequency response for a user.

5. The wearable apparatus of claim 1, wherein the computing system is further programmed to detect, via the microphone, speech from a user.

6. The wearable apparatus of claim 5, wherein:
   the speech from the user comprises a command; and
   the computing system is further programmed to direct the sound transducer to provide a response to the command.

7. The wearable apparatus of claim 6, wherein the computing system comprises an artificial-reality personal assistant.

8. The wearable apparatus of claim 1, wherein the sound transducer comprises:
   a right sound transducer positionable against a tragus of a user's right ear to convert an electrical signal to a vibration such that the tragus of the user's right ear; and
   a left sound transducer positionable against a tragus of a user's left ear to convert an electrical signal to a vibration such that the tragus of the user's right left ear.

9. The wearable apparatus of claim 8, wherein the computing system is configured to calibrate the vibration of the sound transducer by improving a sound balance between the right sound transducer and the left sound transducer.

10. The wearable apparatus of claim 9, wherein the computing system is configured to improve the sound balance by using a head-related transfer function for the user's right and left ears to adjust sound waves to deliver spatial audio by simulating sound in a three-dimensional space through binaural audio reproduction.

11. The wearable apparatus of claim 10, wherein:
    the head-related transfer function comprises a left head-related transfer function and a right head-related transfer function; and
    the computing system is configured to deliver the spatial audio by:
    filtering a left signal by driving the left sound transducer with a left head-related transfer function; and
    filtering a right signal by driving the right sound transducer with a right head-related transfer function.

12. The wearable apparatus of claim 1, wherein the computing system is configured to calibrate the vibration of the sound transducer by calibrating the sound transducer to represent sound originating from at least one of varying distances or varying directions.

13. A wearable apparatus comprising:
    a left sound transducer positionable against a tragus of a user's left ear to convert a left electrical signal to a left vibration such that the tragus of the user's left ear acts as a left diaphragm for the left sound transducer to produce a left sound wave;
    a right sound transducer positionable against a tragus of a user's right ear to convert a right electrical signal to a right vibration such that the tragus of the user's right ear acts as a right diaphragm for the right sound transducer to produce a right sound wave; and
    a computing system communicatively coupled to the left and right sound transducers and programmed to calibrate the left vibration of the left sound transducer and the right vibration of the right sound transducer to improve a sound balance between the left sound transducer and the right sound transducer.

14. The wearable apparatus of claim 13, further comprising:
    a left microphone positionable at an opening of a left canal of the user's left ear to detect the left sound wave produced by the tragus of the user's left ear; and
    a right microphone positionable at an opening of a right canal of the user's right ear to detect the right sound wave produced by the tragus of the user's right ear.

15. The wearable apparatus of claim 14, wherein the computing system is programmed to:
    compare an expected left sound pressure to left sound pressure detected by the left microphone;
    calibrate, based on the comparison of the left expected sound pressure to the left detected sound pressure, a vibration of the left sound transducer;
    compare an expected right sound pressure to right sound pressure detected by the right microphone; and
    calibrate, based on the comparison of the left expected sound pressure to the right detected sound pressure, a vibration of the right sound transducer.

16. The wearable apparatus of claim 13, wherein the computing system is configured to improve the sound balance by using a head-related transfer function for the user's right and left ears to adjust sound waves to deliver spatial audio by simulating sound in a three-dimensional space through binaural audio reproduction.

17. The wearable apparatus of claim 16, wherein:
    the head-related transfer function comprises a left head-related transfer function and a right head-related transfer function; and
    the computing system is configured to deliver the spatial audio by:
    filtering a left signal driving the left sound transducer with a left head-related transfer function; and
    filtering a right signal driving the right sound transducer with a right head-related transfer function.

18. A method comprising:
directing a sound transducer positioned against a tragus of a user's ear to convert an electrical signal to a vibration such that the tragus of the user's ear acts as a diaphragm for the sound transducer;
directing a microphone positioned at an opening of a canal of the user's ear to detect sound pressure of a sound wave produced by the tragus; and
comparing an expected sound pressure to sound pressure detected by the microphone;
calibrating, based on the comparison of the expected sound pressure to the detected sound pressure, a vibration of the sound transducer.

19. The method of claim 18, wherein:
the electrical signal comprises an audio signal associated with an artificial-reality video signal that is synchronized with the audio signal and displayed to a user via a display device of an artificial-reality headset; and
the artificial-reality headset comprises the sound transducer and the microphone.

20. The method of claim 18, wherein:
the sound transducer comprises:
  a right sound transducer positionable against a tragus of a user's right ear to convert an electrical signal to a vibration such that the tragus of the user's right ear acts as a right diaphragm for the right sound transducer; and
  a left sound transducer positionable against a tragus of a user's left ear to convert an electrical signal to a vibration such that the tragus of the user's left ear acts as a left diaphragm for the left sound transducer; and
calibrating the vibration of the sound transducer comprises improving a sound balance between the right sound transducer and the left sound transducer.

* * * * *

UNITED STATES PATENT AND TRADEMARK OFFICE
CERTIFICATE OF CORRECTION

PATENT NO. : 10,999,668 B2
APPLICATION NO. : 16/701675
DATED : May 4, 2021
INVENTOR(S) : Khaleghimeybodi It is certified that error appears in the above-identified patent and that said Letters Patent is hereby corrected as shown below:

In the Claims

Claim 8, at Column 11, Lines 46-53 should read:
The wearable apparatus of claim 1, wherein the sound transducer comprises:
a right sound transducer positionable against a tragus of a user's right ear to convert an electrical signal to a vibration such that the tragus of the user's right ear acts as a diaphragm for the right sound transducer;
and a left sound transducer positionable against a tragus of a user's left ear to convert an electrical signal to a vibration such that the tragus of the user's left ear acts as a diaphragm for the left sound transducer.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*